United States Patent

Kwantes et al.

[15] 3,671,559

[45] June 20, 1972

[54] PROCESS FOR CARBONYLATING ALKANOLS

[72] Inventors: Arien Kwantes; Bernhard Stouthamer, both of Amsterdam, Netherlands

[73] Assignee: Shell Oil Company, New York, N.Y.

[22] Filed: July 9, 1969

[21] Appl. No.: 840,196

[30] Foreign Application Priority Data

Nov. 15, 1968 Great Britain..................54,331/68

[52] U.S. Cl. ..........................260/413, 260/532, 260/514 C
[51] Int. Cl. .........................................................C07c 51/12
[58] Field of Search ...................260/532, 533 A, 497 R, 413

[56] References Cited

UNITED STATES PATENTS

| | | | |
|---|---|---|---|
| 2,986,577 | 5/1961 | Kurhajec | 260/532 X |
| 2,135,451 | 11/1938 | Loder | 260/532 |
| 2,158,031 | 5/1939 | Loder | 260/532 X |
| 2,217,650 | 10/1940 | Loder | 260/532 |
| 2,739,169 | 3/1956 | Hagemeyer | 260/532 X |
| 3,282,993 | 11/1966 | Chafetz et al. | 260/533 A |
| 3,527,779 | 10/1970 | Paulis et al. | 260/533 A |
| 3,349,017 | 10/1967 | Pawlenko | 260/497 R |

FOREIGN PATENTS OR APPLICATIONS 1,142,167  1/1963   Germany.............................260/532

*Primary Examiner*—Lorraine A. Weinberger
*Assistant Examiner*—Richard D. Kelly
*Attorney*—John J. Colvin and E. Walter Mark

[57] ABSTRACT

Controlled addition of olefins to alcohol carbonylation zone to prevent water build-up and sustain acidic liquid catalyst activity.

4 Claims, 1 Drawing Figure

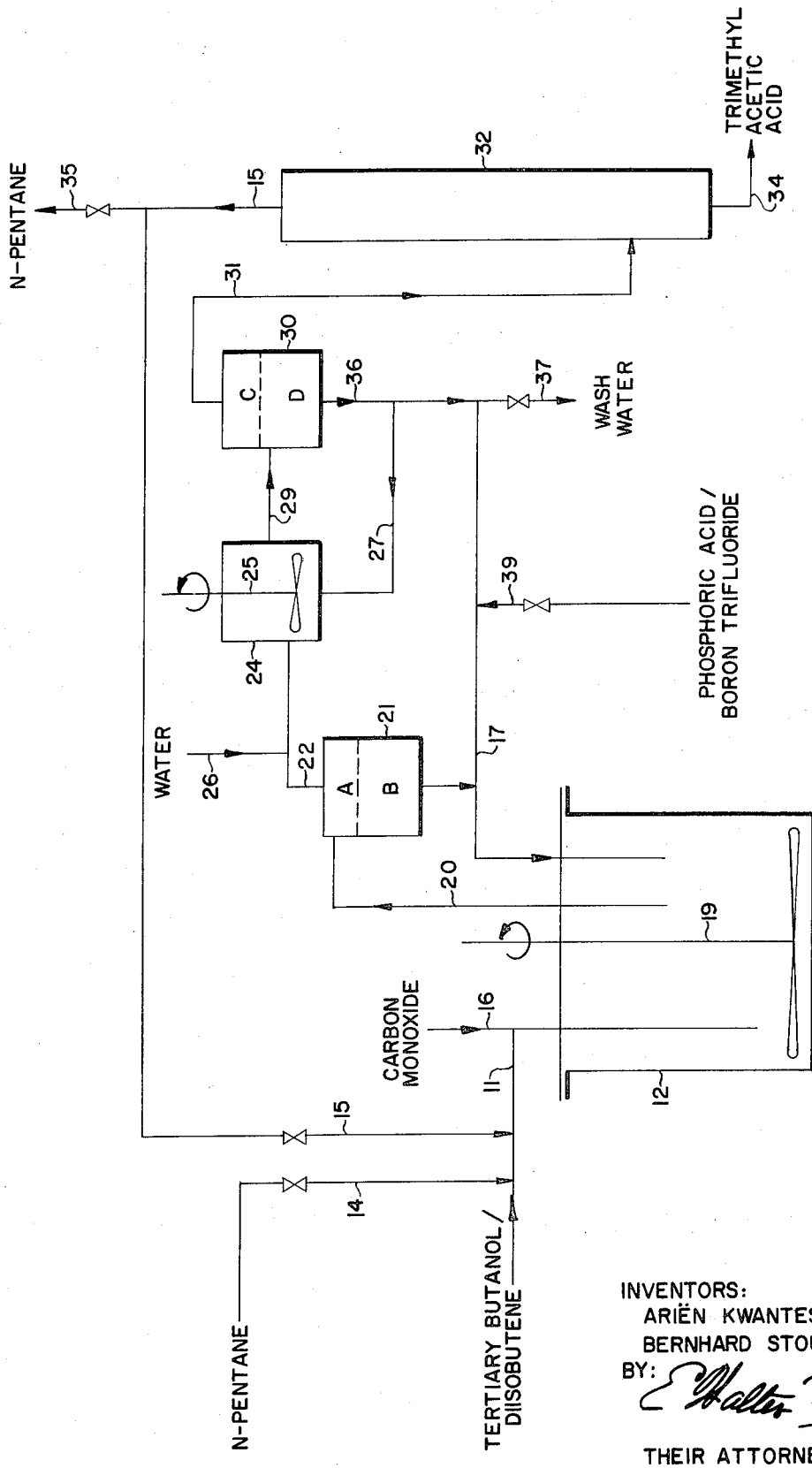

PROCESS FOR CARBONYLATING ALKANOLS

BACKGROUND OF THE INVENTION

It is known that monohydric alcohols are converted into carboxylic acids, when caused to react with carbon monoxide in the presence of a strongly acidic liquid catalyst. The carboxylic acid mainly formed is a monocarboxylic acid having one carbon atom per molecule more than the starting alcohol. Depending on the monohydric alcohol and acid involved, ester may be formed to a varying degree. This ester formation generates water. In addition, a small quantity of water is formed when a minor quantity of monocarboxylic acids having a higher molecular weight than the desired acid formed. Although many of the acidic catalysts employed in this reaction contains minor amounts of water, major addition of water to the catalysts tends to reduce their activity unacceptably. Thus, in a continuous process, wherein the catalyst is recirculated in the absence of water removal, the catalyst would become increasingly inactive by gradual dilution.

STATEMENT OF THE INVENTION

It has now been found that undesirable water build-up may be eliminated in the continuous production of a carboxylic acid and/or ester by reaction of a monohydric alcohol with carbon monoxide by adding during the course of the process a suitable water binding or water removing material. In accordance with the invention organic acids and/or esters are produced with improved efficiency and in the absence of any substantial water build-up by the steps comprising:

a. introducing into a reactor a highly acidic liquid catalyst, the monohydric alcohol to be converted and carbon monoxide,
b. dividing the liquid reactor effluent into a phase comprising carboxylic acid and/or ester and a phase comprising water-containing highly acidic liquid catalyst,
c. recycling at least part of the highly acidic liquid catalyst phase to the reactor, and
d. introducing into the reactor a controlled amount of an olefin capable of reacting in the water under the conditions employed.

In a preferred aspect of the invention the olefin added is one which under the reaction conditions employed will react with both carbon monoxide and water to form the desired carboxylic acid and/or ester.

The invention will be described hereinafter with reference to the accompanying drawing, wherein the single figure illustrates more or less diagrammatically one form of apparatus suitable for carrying out the invention.

WATER REMOVING OLEFIN

Olefins used for water-removal in the process of the invention comprise the monoolefins, and monoolefin-containing mixtures, which upon reaction with carbon monoxide and water form the acid and/or ester corresponding to the desired alcohol carbonylation reaction product. Certain other olefins may similarly remove water; however, acids formed therefrom are generally contaminants which must then be separated from the desired product.

When a primary alcohol is charged the corresponding alpha olefin is preferably used as the water removing compound. For example, pentene-1 is used with pentanol-1; both forming the secondary acid, 2-methylpentanoic acid under the conditions employed.

Secondary alcohol starting materials generally result in the substitution of a carboxylic group for the hydroxyl group. For example, butanol-2 reacts with carbon monoxide to form 2-methyl butanoic acid. In the latter case either butene-1 or butene-2 is preferably used as the water-removing olefin.

When a tertiary alcohol is used as starting material the resulting acid will generally correspond to the substitution of a carboxylic group for the hydroxyl group. For example, tert-butanol is converted with carbon monoxide into trimethyl acetic acid. In this case isobutylene is the preferred water-removing compound, the carbon monoxide adding to the more branched olefinic carbon.

Olefins suitable as water-removing compound according to the invention comprise both monoolefins which under the reaction conditions applied do not undergo any substantial decomposition, and monoolefins which under the conditions decompose partly or completely into lower olefins. Preference is given to olefins belonging to the latter group since they can be stored as a liquid under atmospheric pressure at ambient temperature. Examples of the latter group are diisobutene, triisobutene and tetraisobutene; the first two being preferred. Olefins of this group decompose for the greater part into isobutene, which subsequently reacts relatively rapidly with water and carbon monoxide under the conditions employed to form trimethyl acetic acid.

ALCOHOL CHARGE

The organic charge reacted with carbon monoxide in accordance with the invention comprises organic compounds containing one aliphatic carbinol group as the sole reactive group. Suitable organic compounds comprise the alcohols represented by the empirical formula:

R—OH wherein R represents a hydrocarbyl group containing at least three carbon atoms attached to the oxygen atom through an aliphatic carbon atom. R preferably represents a saturated hydrocarbon radical, either alkyl or cycloalkyl such as propyl, n-butyl, i-butyl, tert buytl, amyl, hexyl, heptyl, octyl, nonyl, decyl and corresponding cycloalkyls and hydrocarbon-sustituted cycloalkyls. R most preferably represents a secondary or tertiary alkyl. Examples of alcohols of the above-defined class are: n-propanol, n-butanol, tert-butanol, isopropanol, cyclohexanol, methylisobutyl carbinol, cyclohexanol, methylisobutyl carbinol, cyclopentyl carbinol, the normal, secondary and tertiary hexanols, heptanols, octanols, nonanols and decanols. A suitable charge material comprises the alcoholic products of the OXO synthesis. Alcohols having from three to twenty carbon atoms to the molecule constitute preferred charge materials to the process. Of the suitable alcohol charge materials, those having from three to 10 carbon atoms to the molecule wherein a hydroxyl group is directly attached to a secondary or tertiary carbon atom are particularly preferred, such as isopropanol, sec-butanol, tert butanol, sec- and tert hexanol, and the like. Most preferred are the tertiary alcohols of from three to 10 carbons.

As stated hereinbefore, alcohols are converted into acids and/or esters. Which product predominates depends in part upon the alcohol charged. Little or no esterification takes place when the acid is formed at a high reaction rate. However, when the acid is formed at a relatively low rate, it is being formed in the presence of a relatively large proportion of alcohol and therefore will more easily esterify.

When primary alcohols generally react relatively slowly and the acid formed is subsequently converted nearly entirely into the ester. Secondary alcohols react relatively fast with carbon monoxide under the conditions of the present process, so that only a relatively small part of the acid formed is converted into ester. Tertiary alcohols react very fast with carbon monoxide, only acids and no esters being formed. The process according to the invention is therefore particularly attractive for converting tertiary butanol into trimethyl acetic acid, an important starting material for the preparation of a great variety of organic compounds. Furthermore, the acids and/or esters are obtained in a high yield when the preferred secondary and tertiary alcohols are used. Mixtures of two or more of the above-defined alcohols may be charged to the process of the invention.

CARBON MONOXIDE REACTANT

Preferably substantially pure carbon monoxide is used. The process according to the invention, however, is not restricted as regards the source of the carbon monoxide-containing gas to be used. The carbon monoxide-containing gas may be any mixture of carbon monoxide with one or more inert gases, such as for example hydrogen, nitrogen or gaseous alkanes. The carbon monoxide is preferably present in a gas containing at least 50 percent by volume of carbon monoxide.

ACIDIC CATALYST

A great variety of highly acidic liquid catalysts may be used in the process according to the invention. Suitable catalysts comprise orthophosphoric acid, sulfuric acid, chlorosulphonic acid, or mixtures thereof with boron trifluoride and water. The preferred liquid catalyst is a liquid complex mixture of orthophosphoric acid, boron trifluoride and water. The reaction under the influence of this catalyst is very rapid so long as the amount of water present is controlled. Side reactions such as polymerizations hardly occur. In these preferred catalysts, the molar ratio of $H_2O$ to $BF_3$ is suitably maintained between about 1 to 1 and about 2.3 to 1, these ratios giving optimal catalytic activity. Preferred are molar ratios of $H_2O$ to $BF_3$ between about 1 to 1 and about 2 to 1 with ratios between about 1.2 and 1 and about 2 to 1 being especially preferred. The molar ratio of $BF_3$ to $H_3PO_4$ is suitably maintained between about 2 to 1 and about 20 to 1 with ratio between about 2 to 1 and about 10 to 1 being preferred. More preferred are molar ratios of $BF_3$ to $H_3PO_4$ of from about 2.5 to 1 about 6 to 1 with ratios of from about 3 to 1 to about 4.5 to 1 being especially preferred.

REACTION CONDITIONS

The process of the invention is preferably carried out at a carbon monoxide partial pressure in the range of from about 25 to about 400 kg/cm$^2$ and in particular in the range of from 50 to 200 kg/cm$^2$.

The process is preferably carried out at a temperature in the range of from 50° to 150° C, but temperatures outside the latter range may be used as well. The desired carboxylic products are obtained in very high yield when the process is carried out at a temperature in the range of from 75° to 125° C.

The process may be carried out in any form of continuous reactor. The yield of carboxylic acid and/or ester is favorably influenced when the reaction mixture is vigorously stirred. Therefore, the reactor is preferably provided with a stirrer having a power input of at least 0.5 hp per m$^3$.

The liquid reactor effluent usually consists of one liquid phase. Addition of an inert solvent for the carboxylic acid to the reaction mixture facilitates working up of the reactor effluent as it effects a phase separation into a phase comprising carboxylic acid and/or ester and a phase comprising highly acidic liquid catalyst. Preferred inert solvents comprise saturated unbranched hydrocarbons, in particular of those having five, six or seven carbon atoms per molecule. Examples of such hydrocarbons are n-pentane, n-hexane, n-heptane, cyclopentane and cyclohexane and mixtures thereof. Examples of other inert solvents are isobutane and 2,2-dimethyl butane.

Splitting up of the liquid reactor effluent may be carried out in any desired manner. The effluent is preferably split up utilizing the phase separation which occurs when inert diluent is added as described hereinbefore. Separation is then carried out, for example, in a settling tank. The highly acidic liquid catalyst recovered by phase separation as an aqueous phase is preferably recycled quantitatively to the reactor. The carboxylic acid phase is preferably washed with water, thus removing water-soluble compounds, particularly catalyst. For this washing any known technique and apparatus are in principle suitable. For example, a stirred vessel may be used. The said washing procedure is preferably carried out in a rotating disc contractor. The material to be washed and water are preferably passed through the said contractor in countercurrent. The water used to wash the carboxylic acid phase may be partly and is preferably quantitatively recycled to the reactor. The water thus introduced into the reactor is easily removed by using a correspondingly larger quantity of water-removing compound.

The washed material, consisting of carboxylic acids and inert diluent may be further purified by distillation of the inert diluent overhead and separating the acids as a bottom product. This distillation is preferably carried out at atmospheric or subatmospheric pressure, distilling at subatmospheric pressure having as an advantage that decomposition of the carboxylic acids and/or esters being distilled is avoided. The acids thus purified can, if desired, be further purified by one or more known techniques.

Referring to the drawing: as typical, the preparation of trimethyl acetic from tertiary butanol, using n-pentane as solvent and diisobutene as water-removing compound is described hereinafter.

Tertiary butanol and diisobutene are introduced via line 11 into reactor 12. As solvent n-pentane is introduced into the reactor via valved line 14, or preferably at least in part as recycle via valved line 15. Carbon monoxide is supplied via line 16, and a recycle stream of a liquid complex mixture of phosphoric acid, boron trifluoride and water is supplied via line 17 to reactor 12. Reactor 12 is provided with a mechanical stirrer 19. Liquid is withdrawn from reactor 12 via line 20 and introduced into a settling tank, 21. In settling tank 21 an upper phase A consisting of a solution of trimethyl acetic acid in n-pentane containing a minor quantity of acids having more carbon atoms per molecule than trimethyl acetic acid, is separated and conducted via line 22 to mixing vessel 24 equipped with stirrer 25, in which the crude acid is washed with water. This water is supplied to vessel 24 partly as make-up water supplied via line 26 and partly as recycle via line 27. The mixed liquids are withdrawn from vessel 25 via line 29 and introduced into a settling tank, 30, from which the upper phase C, which consists of crude trimethyl acetic acid and n-pentane, is withdrawn via line 31 and conducted into a fractionator 32. The bottom fraction withdrawn from fractionator 32 via line 34 consists of crude trimethyl acetic acid which may be further purified, if desired, by means not shown.

The overhead fraction withdrawn from column 32 via line 15 consists of n-pentane and may be removed via valved line 35 but preferably is introduced into line 11, as mentioned hereinbefore. The lower phase D obtained in settling tank 30 consists of wash water and is conducted, partly via lines 36 and 27 to vessel 24, as described hereinbefore, and partly via line 36 either to valved line 37 for removal or preferably to line 17 for recycle to reactor 12. The lower phase B separated in settling tank 21 is recycled via line 17 to reactor 12 as described hereinbefore. Make-up catalyst is added via valved line 39.

The amount of diisobutene supplied via line 11 is sufficient to remove the water formed inside reactor 12 as well as the water introduced into the reactor via line 17.

The process of the invention is further illustrated by way of the following Example.

EXAMPLE

In a continuous operation 400 g of liquid catalyst, 111 g of tertiary butanol, 100 g of n-pentane and 19.8 g of diisobutene were fed per hour to a reactor having a volume of ½ liter made of "Hastelloy C" (a registered trade name), provided with 4 baffles and a double-blade propeller stirrer. The catalyst consisted of ortho phosphoric acid, boron trifluoride and water in a molar ratio of 1 : 4 : 6.5, respectively. The temperature of the reactor contents was maintained at 100° C, the carbon monoxide pressure was 100 kg/cm$^2$, pure carbon monoxide being used.

The liquid leaving the reactor was separated into liquid catalyst and dilute acids, the latter phase was washed with water and subsequently n-pentane was distilled off from the washed dilute acids. The separated liquid catalyst and the spent wash water were returned to the reactor. The acids were obtained in a quantity of 181 g/h, indicating that the tertiary butylalcohol and the diisobutene fed to the reactor were fully converted into acids.

The composition of the acids is presented in Table I.

TABLE I

|  | %w |
|---|---|
| <$C_5$ acids | 0.1 |
| trimethyl acetic acid | 83.0 |
| $C_6$–$C_8$ acids | 2.2 |
| $C_9$ acids | 13.6 |
| $C_{13}$ acids | 1.1 |

The water balance of the material entering the reactor and the material leaving the reactor was as follows:

|  | g/h |  | g/h |
|---|---|---|---|
| water present in recycled catalyst | 64 | water present in liquid leaving the reactor | 64 |
| water present in wash water | 3.0 | water removed by diisobutene | 5.7 |
| water formed inside the reactor | 2.7 |  |  |
| Total: | 69.7 | Total: | 69.7 |

The results of this experiment show that diisobutene is capable of removing water under the conditions prevailing in the reactor.

We claim as our invention:

1. In the process wherein, in a reaction mixture, an alkanol selected from the group consisting of secondary and tertiary monohydric alkanols having from 3 to 20 carbon atoms is continuously contacted in liquid phase with carbon monoxide in the presence of an aqueous catalyst comprising a mixture of $H_3PO_4$, $BF_3$, and water, in which catalyst the molar ratio of $BF_3$ to $H_3PO_4$ has a value between about 2 to 1 and about 20 to 1 and the molar ratio of water to $BF_3$ has a value between about 1 to 1 and about 2.3 to 1, the improvement consisting essentially of (a) effecting the contacting at a temperature in the range of from about 50° C to about 150° C, while maintaining the molar ratio of water to $BF_3$ in the defined range by the controlled addition of a monoolefinically unsaturated hydrocarbon having from 3 to 20 carbon atoms to the reaction mixture and (b) continuously removing the resulting carboxylic acid-containing mixture and separating into an organic phase consisting essentially of carboxylic acid and unreacted alkanol and an aqueous catalyst phase and (c) returning said aqueous catalyst phase to the reaction mixture.

2. The process in accordance with claim 1 wherein said alkanol is secondary or tertiary alkanol having from about 3 to about 10 carbon atoms and said monoolefinically unsaturated hydrocarbon comprises a major proportion of an olefin having from 3 to 10 carbon atoms.

3. The process in accordance with claim 2 wherein said alkanol is isobutanol and said monoolefinically unsaturated hydrocarbon is selected from the group consisting of isobutene, diisobutene, triisobutene and tetraisobutene.

4. The process in accordance with claim 1 wherein an inert solvent comprising saturated unbranched hydrocarbons having from about 5 to about 7 carbon atoms per molecule is added to the reaction mixture.

* * * * *